US007091980B2

(12) United States Patent
Tidwell

(10) Patent No.: US 7,091,980 B2
(45) Date of Patent: Aug. 15, 2006

(54) SYSTEM AND METHOD FOR COMMUNICATING DIGITAL DISPLAY DATA AND AUXILIARY PROCESSING DATA WITHIN A COMPUTER GRAPHICS SYSTEM

(75) Inventor: Reed P. Tidwell, Centerville, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 108 days.

(21) Appl. No.: 10/651,310

(22) Filed: Aug. 28, 2003

(65) Prior Publication Data

US 2005/0046631 A1 Mar. 3, 2005

(51) Int. Cl.

*G09G 5/397* (2006.01)
*G06F 15/16* (2006.01)
*G06F 13/14* (2006.01)
*G06F 12/02* (2006.01)

(52) U.S. Cl. ...................... 345/546; 345/503; 345/520; 345/544

(58) Field of Classification Search ................ 345/503, 345/520, 522, 531, 534, 543–546, 548
See application file for complete search history.

(56) References Cited

U.S. PATENT DOCUMENTS 4,335,402 A 6/1982 Holmes
5,559,954 A 9/1996 Sakoda et al.
5,610,665 A 3/1997 Berman
6,005,580 A * 12/1999 Donovan .................... 345/428
6,285,407 B1 9/2001 Yasuki et al.
6,556,627 B1 4/2003 Kitamura et al.
6,727,918 B1 * 4/2004 Nason ........................ 715/791
6,798,418 B1 * 9/2004 Sartori et al. ............... 345/519
2001/0002124 A1 * 5/2001 Mamiya et al. ............. 345/132
2003/0038807 A1 * 2/2003 Demos et al. .............. 345/473
2003/0048275 A1 * 3/2003 Ciolac ......................... 345/544
2003/0160780 A1 * 8/2003 Lefebvre et al. ............ 345/419
2003/0235304 A1 * 12/2003 Evans et al. ................ 380/216
2004/0085283 A1 * 5/2004 Wang ......................... 345/100
2004/0179007 A1 * 9/2004 Bower et al. ............... 345/419

* cited by examiner

*Primary Examiner*—Kee M. Tung
*Assistant Examiner*—Aaron M. Richer
(74) *Attorney, Agent, or Firm*—Thorpe North & Western LLP

(57) ABSTRACT

A method for communicating digital display data and associated auxiliary processing data from a frame buffer to a post processor. The method includes storing the display data and the auxiliary processing data in the frame buffer, forming video scan lines from the frame buffer by handling both the display data and the auxiliary processing data as video data, and transferring the video scan lines over a digital video interface to a post-processor.

14 Claims, 3 Drawing Sheets

SYSTEM AND METHOD FOR COMMUNICATING DIGITAL DISPLAY DATA AND AUXILIARY PROCESSING DATA WITHIN A COMPUTER GRAPHICS SYSTEM

BACKGROUND OF THE INVENTION

1. Field of the Invention

The present invention relates generally to the field of computer graphics.

2. Related Art

Computer graphics systems typically store digital format display images in a frame buffer, wherein the rows and columns of the frame buffer correspond to the rows and columns of the display monitor. A graphics rendering engine generates and stores the pixels for the display images in the frame buffer. A graphics processor then extracts the pixels for the display images, formats them, and sends them as a video frame. A digital to analog converter between the graphics processor and the display monitor converts the video frame into an analog video signal for the display monitor.

Alternatively, display images may be transferred from the frame buffer to a graphics post-processor which performs additional graphics processing on the display image prior to digital to analog conversion and display. For example, some computer graphics systems interpose post-processing between an image generation system and a display to perform window processing. The display images are supplemented with window ID information provided by the image generation system. Window ID information is generally considered auxiliary pixel data that identifies pixels as part of an area of the display (i.e., a window). Each window ID value is associated with a set of characteristics and features common to pixels within that window. For example, one window may contain monochrome pixels while another contains color pixels. The window ID information is used to modify the display images, which are then transferred to the display. Other computer graphics systems provide post-processing to perform various image enhancements, for example color translation.

In computer graphics systems in general, it is sometimes desired to transfer display images from a frame buffer to a post-processor supplemented with additional auxiliary information, e.g., window ID or illumination intensity. Communicating this auxiliary data from the image generation system to the post-processor has typically required implementing custom interfaces, for example, by providing a separate auxiliary data interface or by adding special operational modes to a video interface. Such custom interfaces, however, add cost and significant complexity.

Although various techniques are known for supplementing analog video data with additional information encoded during the blanking intervals, a digital data format and transfer mechanism is desired since both the frame buffer and post-processor handle data in a digital format. In addition, digital displays with digital interfaces are now being used.

Known digital video interfaces, such as the Digital Visual Interface (DVI), are available which can transfer display images in a digital format (as opposed to analog), but they do not provide the capability to supplement the display images with additional information. In particular, many known digital video interfaces do not permit the transfer of data during the blanking intervals.

SUMMARY OF THE INVENTION

The invention includes a method of communicating digital display data and associated auxiliary processing data from a frame buffer to a post processor. The method includes storing the display data and the auxiliary processing data in the frame buffer. A further operation is forming video scan lines from the frame buffer by handling both the display data and the auxiliary processing data as video data. The method also includes transferring the video scan lines over a digital video interface to the post-processor.

Additional features and advantages of the invention will be apparent from the detailed description which follows, taken in conjunction with the accompanying drawings, which together illustrate, by way of example, features of the invention.

DETAILED DESCRIPTION

Figure 1:
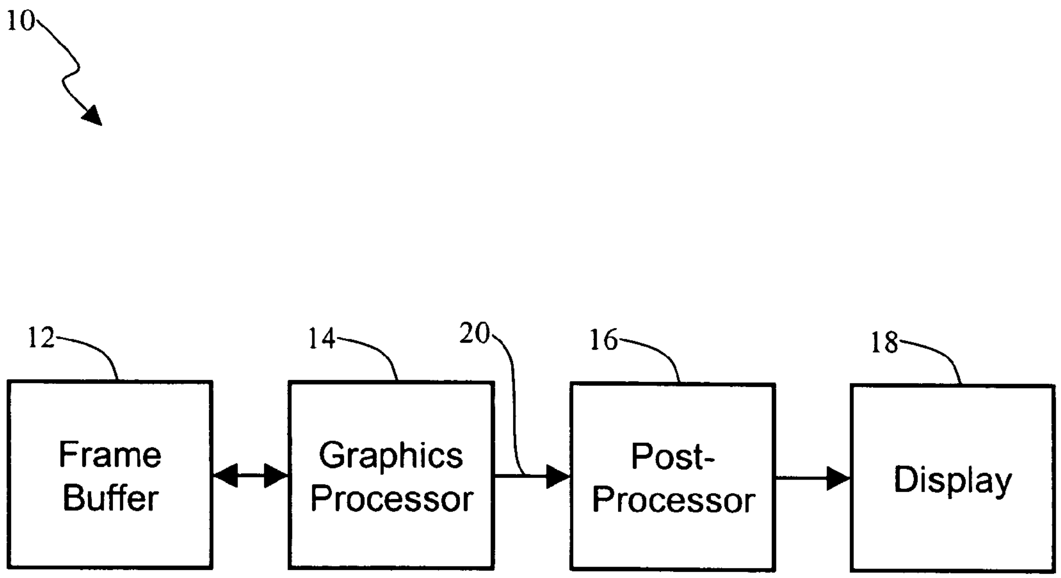
FIG. 1 is block diagram of a computer graphics system including a system for communicating display images and associated auxiliary processing data in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 illustrates a computer graphics system including a system for communicating display images and associated auxiliary processing data via a single interface, as indicated generally at 10, in accordance with an embodiment of the present invention. The system may include a frame buffer 12, a graphics processor 14, a post-processor 16, and a display 18.

Digital display data representing an image may be written into the frame buffer 12. The digital display data consists of pixels generated by an image generator or graphics rendering system. Auxiliary processing data may also be written into the frame buffer. The graphics processor 14 extracts the display data and auxiliary data from the frame buffer to form video scan lines by handling both the display data and the auxiliary processing data as video data. The graphics processor transfers the video scan lines via the digital video interface 20 to the post-processor 16. The post-processor uses the auxiliary processing data to post-process the display data.

Figure 2:
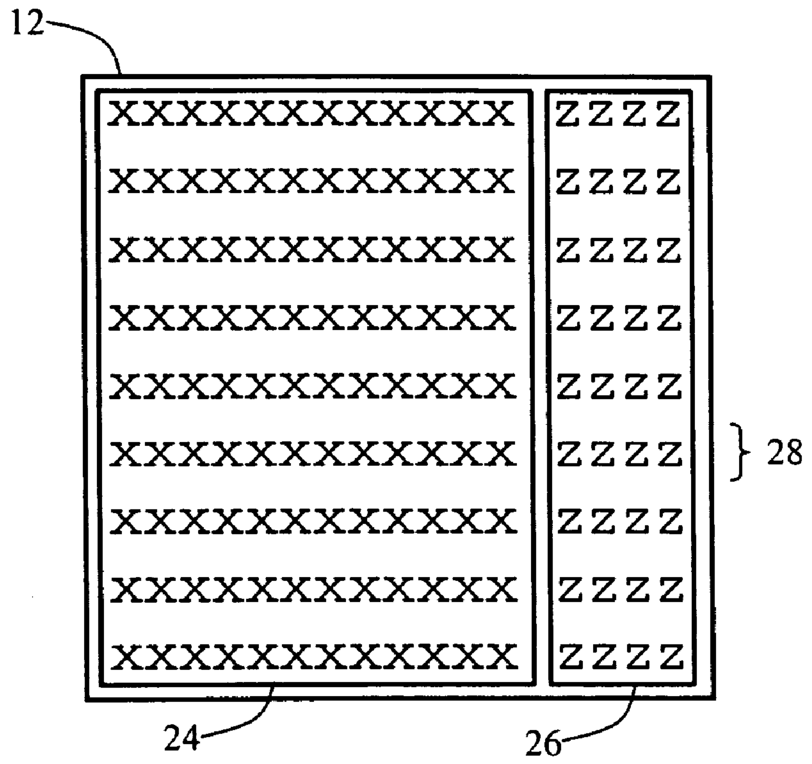
FIG. 2 is an illustration of one possible arrangement of a frame buffer of FIG. 1.
Figure 3:
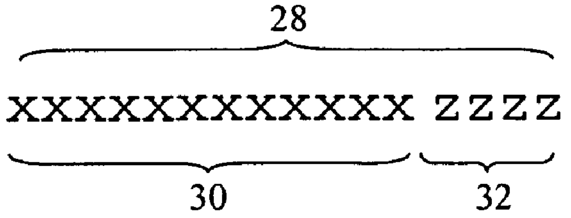
FIG. 3 is an illustration of one possible arrangement of a row of a frame buffer of FIG. 2.

Each of the components of the system is now described in further detail. The frame buffer 12 can be arranged as illustrated in FIG. 2. In one embodiment, the frame buffer can be partitioned into a first part, referred to as a visible image window 24, and a second part, referred to as an auxiliary window 26. The auxiliary processing data can be stored in a horizontal row extension of the visible image window. Horizontal rows 28 of the frame buffer may thus consist, as illustrated in FIG. 3, of display data 30 and auxiliary processing data 32. The auxiliary processing data in each horizontal row can be associated with the display data placed within that same horizontal row. This allows the post-processor 16 to process each horizontal row immediately upon receipt, rather than requiring the buffering of an entire frame. Alternately, the frame buffer may be configured differently, for example, by interleaving the display data and auxiliary processing data within each line or throughout the frame. Alternate arrangements of the display data and auxiliary processing data may be created by or occur to one skilled in the art.

The graphics processor 14 forms video scan lines by extracting the horizontal rows 28 from the frame buffer 12. By handling both the display data 30 and auxiliary processing data 32 as video data, the graphics processor does not need to implement special cycles to transfer the auxiliary processing data. Hence, the graphics processor may be implemented using a conventional graphics processor chip set. The graphics processor treats the display data and auxiliary processing data stored in the frame buffer as a single image of the frame buffer size. The graphics processor formats video scan lines for transmission to the post-processor 16 via a digital video interface 20.

In order to transfer the additional data, the horizontal active time is increased to account for the addition of the auxiliary processing data 32 to the display data 30. In other words, the graphics processor 14 and digital video interface 20 transfer the display data and auxiliary data as though both sets of data are visible pixels. Note that merely extending the transmission of pixels into the horizontal blanking interval is prohibited by most common digital video interfaces. By extending the horizontal active time, compatibility with conventional interfaces is maintained.

Interfacing and internal design of the post-processor 16 may be simplified by maintaining the same line and frame rate for the digital video interface 20 as the display 18. This may be accomplished by decreasing the horizontal blanking interval by the same amount the horizontal active time is increased. Conventional digital video interfaces, however, usually require a minimum horizontal blanking interval which must be observed to maintain compatibility.

For example, a common video format is 1280×1024 using 24-bit pixels at 75 Hz. Display data of this base frame size may be transferred using the Digital Visual Interface (DVI) by forming horizontal scan lines with a horizontal active time of 1280 pixel times and a horizontal blanking interval of 408 pixel times. This horizontal line timing is compatible with Video Electronics Standards Association (VESA) and various analog standards. To transfer additional information with this configuration would, however, require an additional interface. Operation of the DVI may be modified, in accordance with an embodiment of the present invention, to allow the additional auxiliary processing data to be transferred over the same DVI communication interface as the display data.

The DVI requires a minimum horizontal blanking interval of 128 pixel times. Hence, the horizontal blanking interval may be reduced, for example, from 408 to 192 pixels. This provides 216 additional pixels, which can be used to extend the horizontal active time. Hence, 5184 (216×24) additional bits may be transferred within each horizontal line while maintaining the same pixel, line, and frame timing. The 5184 additional bits may be used to transfer auxiliary processing data. The frame buffer may thus be extended from a base frame size of 1280×1024 to an augmented frame size of 1496×1024 to accommodate the addition of the auxiliary processing data. The graphics processor may then be set to transfer frames of 1496×1024.

Other variations of the base frame size and augmented frame size are possible and may prove advantageous in particular applications of the invention. The augmented frame size may be equal to or larger than the base size of the display data, but the augmented frame size may also be varied during operation. For example, if the display mode is changed during operation, it may be necessary to change the base frame size, and hence to change the augmented frame size. Alternately, if the type of post-processing to be performed is changed during operation, it may be necessary to change the augmented frame size to accommodate a different quantity of auxiliary data.

The frame buffer 12 may also be extended in the vertical direction to add additional lines of auxiliary processing data. These lines can be transferred in a similar manner, by extending the vertical active time and reducing the vertical blanking interval.

Implementation of the digital video interface 20 using a known interface, such as DVI, is valuable. Common interfaces can provide lower cost and readily available chips sets with which to implement the graphics processor and digital video interface. Other digital video interface standards that can be used advantageously with the current invention include the VESA and Digital Flat Panel (DFP) defined interfaces; however, the digital video interface is not limited to any particular implementation.

Referring back to FIG. 1, the post-processor 16 receives the video scan lines via the digital video interface 20, and extracts the display data and auxiliary processing data. The post-processor then post-processes the display data using auxiliary processing data to create a post-processed image.

The post-processor 16 can output the post-processed image to the display 18 using a digital or analog interface. The post-processor may output the post-processed image to the display using the same line and frame timing as the digital video interface 20.

For example, as previously discussed, 1280×1024 base frame size display data may be augmented with auxiliary processing data to produce augmented frames of 1496×1024. The augmented frames are transferred to the post-processor 16 via the digital video interface 20. The post-processor can then use the auxiliary data to post process the display data to produce a 1280×1024 post-processed frame. The post-processed frame may then be transferred to the display 18 using the same frame and line timing as the digital video interface by reducing the horizontal active time and increasing the horizontal blanking time to account for the removal of the auxiliary processing data. In other words, the graphics processor 14 can increases the horizontal active time to accommodate the additional auxiliary processing data, and the post-processor can reduces the horizontal active time back to the original value after using the auxiliary processing data.

The auxiliary processing data can define one or more post-processing algorithms to be performed on the display data or can specify parameters for a post-processing algorithm to be performed on the display data. For example, in one embodiment of the invention, the auxiliary processing data may specify a particular graphics post-processing algorithm out of several graphics post-processing algorithms to be performed on the display data. The auxiliary processing data can include one to N bits for algorithm selection that can allow anywhere from two to a practically unlimited number of algorithms to be selected.

For example, four bits of auxiliary processing data may define one of sixteen different graphics post-processing algorithms to be performed. If four bits of auxiliary processing data are provided for each pixel of the display data, a different post-processing algorithm could be applied to each pixel. The graphics post-processor 16 may thus select the one of sixteen graphics post-processing algorithms defined by the auxiliary processing data and then apply that algorithm to the display data. Examples of graphics post-processing algorithms include filtering, adaptive filtering, edge blending, intensity adjusting, and color correcting. An example post-processing filtering algorithm that may be applied in the present invention is disclosed in U.S. patent application Ser. No. 10/222,223, filed Aug. 16, 2002 by Reed P. Tidwell.

Alternately, in another embodiment of the invention, the auxiliary processing data may specify one or more post-processing parameters to be used in applying a particular graphics post-processing algorithm to the display data. Examples of post-processing parameters include window ID, filtering parameters, image attenuation levels, and alpha.

In yet another embodiment of the invention, the auxiliary processing data may be used to both specify a particular graphics post-processing algorithm and to specify post-processing parameters to be used by that algorithm in processing the display data. In yet another embodiment of the invention, the auxiliary processing data may be used to modify an operating parameter of the graphics post-processing algorithm. Examples of operating parameters include filter span and filter coefficients.

The association between auxiliary processing data and display data may be on an individual pixel basis or between groups of pixels. For example, four bits of auxiliary processing data may be associated with each pixel of display data. These four bits can be used to specify a window ID which is used as an index to control the application of various effects to the pixel such as color correction, gamma correction, or filtering. Alternately, eight bits of auxiliary processing data may be associated with even numbered pixels to specify an attenuation value for edge blending. Alternately, several bits of auxiliary processing data may be associated with an entire horizontal row to specify post-processing to be performed on that row. Various other associations of auxiliary processing data to display data may by created by or occur to one skilled in the art.

Figure 4:
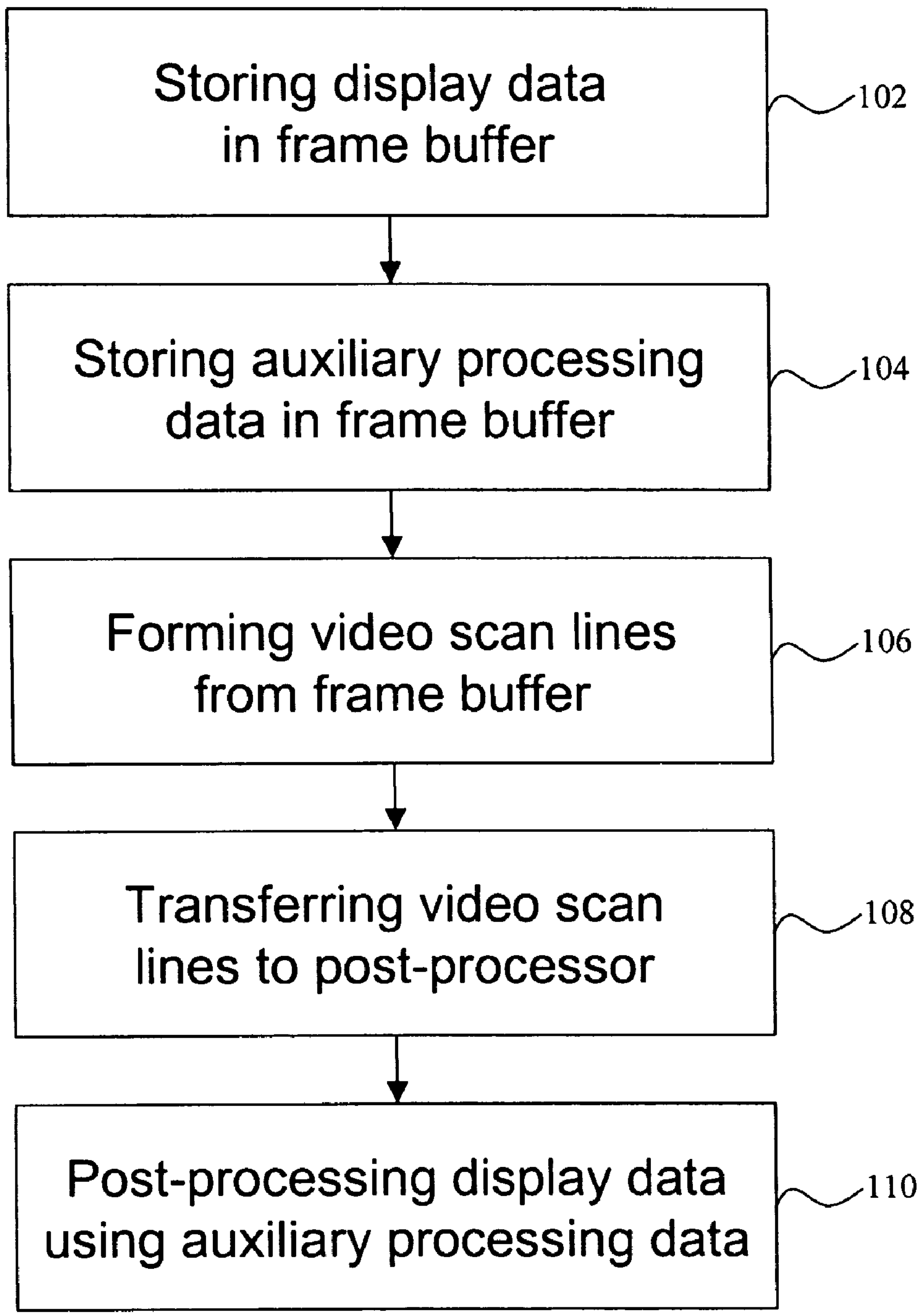
FIG. 4 is a flow chart of a method of communicating display images and associated auxiliary processing data in accordance with another embodiment of the present invention.

FIG. 4 is a flow diagram of a method of communicating display images and associated auxiliary processing data in accordance with an embodiment of the present invention. The method includes the operations of storing display data in a frame buffer 102 and storing associated auxiliary processing data in a frame buffer 104. The order in which display data and auxiliary processing data is stored is flexible. For example, a few bits of associated auxiliary processing data may be stored each time a pixel of display data is stored. Alternately, all of the display data may be stored first and then the auxiliary processing data may be stored. Many other variations in the order of storing the display data and auxiliary processing data may be created by or occur to one skilled in the art.

The method further includes the operation of forming video scan lines from the frame buffer by handling the display and auxiliary processing data as video data 106. Forming video scan lines may be performed by extracting horizontal lines, including both display and auxiliary processing data, from the frame buffer. The method further includes the operation of transferring video scan lines to a post-processor via a digital video interface 108. Finally, the method may further include post-processing the display data using the auxiliary processing data 110.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments of the invention. It will be apparent to those of ordinary skill in the art that numerous modifications can be made without departing from the principles and concepts of the invention as set forth in the claims.

What is claimed is:

1. A method of communicating digital display data and associated auxiliary processing data from a frame buffer to a post-processor in a computer graphics system, comprising the steps of:

storing the display data and the auxiliary processing data in the frame buffer;

forming video scan lines from the frame buffer by handling both the display data and the auxiliary processing data as video data;

extending a horizontal active line time of a digital video interface to enable the digital display data and associated auxiliary processing data to be transferred to the post processor; and transferring the video scan lines over the digital video interface to the post-processor.

2. The method of claim 1, wherein the step of storing the display data and the auxiliary processing data further comprises the step of arranging the display data and auxiliary processing data so that portions of the auxiliary processing data are placed into rows of the frame buffer with corresponding portions of the display data.

3. The method of claim 1, wherein the step of forming video scan lines further comprises the step of increasing a horizontal active line time while reducing a horizontal blanking interval to accommodate the display data and the auxiliary processing data.

4. The method of claim 3, further comprising the steps of:

post-processing the display data to produce post-processed display data by applying the auxiliary processing; and forming video scan lines from the post-processed display data; and transferring the video scan lines to a display.

5. The method of claim 4, wherein the step of forming video scan lines further comprises the step of decreasing a horizontal active line time while reducing a horizontal blanking interval for the post-processed display data.

6. The method of claim 1, wherein the step of forming video scan lines further comprises the step of increasing a vertical active time while reducing a vertical blanking interval to accommodate the display data and the auxiliary processing data.

7. The method of claim 1, further comprising the step of post-processing the display data by applying the auxiliary processing data.

8. A method of post-processing digital display data in a computer graphics system as specified by associated auxiliary processing data, comprising the steps of:

storing the display data and the auxiliary processing data in a frame buffer;

extending a horizontal active line time of a digital video interface to enable the digital display data and associated auxiliary processing data to be transferred to the post processor;

transferring the display data and the auxiliary processing data from the frame buffer to a graphics post-processor via the digital video interface by handling both the display data and the auxiliary processing data as video data; and post-processing the display data as specified by the auxiliary processing data.

9. The method of claim 8, wherein the step of post-processing the display data further comprises the steps of:

selecting one graphics post-processing algorithm specified by the auxiliary processing data from a plurality of graphics post-processing algorithms; and applying the selected graphics post-processing algorithm to the display data.

10. The method of claim 9, wherein the graphics post-processing algorithm is selected from the group of algorithms consisting of filtering, adaptive filtering, edge blending, intensity adjusting, and color correcting.

11. The method of claim 8, wherein the step of post-processing the display data further comprises the step of applying a graphics post-processing algorithm to the display data in accordance with the auxiliary processing data.

12. The method of claim 8, wherein the auxiliary processing data comprises a post-processing parameter selected from the group consisting of window ID, filtering parameters, image attenuation levels, and alpha.

13. The method of claim 8, wherein the step of post-processing the display data further comprises the steps of:

applying a graphics post-processing algorithm to the display data; and modifying an operating parameter of the graphics post-processing algorithm as specified by the auxiliary processing data.

14. The method of claim 8, wherein the step of post-processing the display data is performed by combining multiple pixels of the display data to produce modified display data.

* * * * *